United States Patent [19]

Brännström

[11] Patent Number: 4,705,433
[45] Date of Patent: Nov. 10, 1987

[54] PNEUMATIC TRANSPORTATION SYSTEM WITH A MATERIAL FEEDER

[75] Inventor: Roine Brännström, Finspong, Sweden

[73] Assignee: Asea Stal Aktiebolag, Finspong, Sweden

[21] Appl. No.: 861,212

[22] Filed: May 9, 1986

[30] Foreign Application Priority Data

May 9, 1985 [SE] Sweden ................... 8502301

[51] Int. Cl.$^4$ ............................................. B65G 53/46
[52] U.S. Cl. ...................................... 406/63; 406/127
[58] Field of Search .................... 406/62–64, 406/66, 74, 52, 108, 120, 127; 222/636, 637, 370; 414/219, 220

[56] References Cited

U.S. PATENT DOCUMENTS

| | | | |
|---|---|---|---|
| 2,417,700 | 3/1947 | McCarty | 406/63 |
| 3,311,421 | 3/1967 | Heinemann | 406/63 |
| 3,351,390 | 11/1967 | Dellsperger | 406/62 |
| 3,995,777 | 12/1976 | Diez et al. | 406/63 X |
| 4,154,486 | 5/1979 | Nishikawa | 406/63 X |
| 4,376,600 | 3/1983 | Egli | 406/63 |
| 4,498,818 | 2/1985 | Bjarnason et al. | 406/127 X |
| 4,500,231 | 2/1985 | Staiger | 406/108 X |

FOREIGN PATENT DOCUMENTS

965081  3/1975  Canada .

Primary Examiner—Jeffrey V. Nase
Attorney, Agent, or Firm—Pollock, Vande Sande & Priddy

[57] ABSTRACT

A pneumatic transportation system for transferring particulate material from a storage container at one pressure level to a receiving unit at another pressure level (e.g. in a feeding system for bed material to a combustion chamber of a PFBC plant). The transportation system incorporates a material feeder comprising a housing having a rotor containing two material chambers. The end walls of the housing and the rotor have cooperating sealing surfaces. The inlet opening of one material chamber is positioned opposite to an inlet opening in the upper end wall of the housing, when the outlet opening of the other material chamber is positioned opposite to an outlet opening in the lower end wall of the housing. After rotation of the rotor the inlet opening of the material chamber will be positioned opposite to the inlet opening and the outlet opening of the chamber will be positioned opposite to the outlet opening. Between the actual material chambers and the outlet openings there are cut-off valves. These may be of the so-called L-valve type. The material flow through these valves is regulated by the gas supply via a regulating valve. A rotor with but one chamber is possible.

14 Claims, 7 Drawing Figures

PNEUMATIC TRANSPORTATION SYSTEM WITH A MATERIAL FEEDER

BACKGROUND OF THE INVENTION a. Technical Field

The invention relates to a pneumatic transportation system for transferring a particulate material from a storage container to a receiving unit having a higher or a lower pressure. A system according to the invention is particularly intended for feeding particulate fuel from a storage container to a combustion chamber operating at a higher pressure. The invention can thus replace a conventional sluice or lock hopper system or similar feeding system. A transportation system according to the invention may be included in a power plant for feeding fuel, sulfur absorbent material and bed material into a fluidized bed contained in a pressurized combustion chamber, a so-called PFBC plant, in which the operating pressure in the combustion chamber may be up to about 2 MPa (20 bar). A transportation system according to the invention may also be used for extracting bed material or separated ashes in such a PFBC plant.

b. Prior Art

When transferring particulate material between regions at different pressure levels, a so-called lock hopper system is usually used, that is, two containers are arranged in series with a valve upstream of the first container, between the containers and downstream of the last container. For transferring material from a storage container under atmospheric pressure to a receiving unit under supraatmospheric pressure, material is transferred from the storage container to the first container, while it is under atmospheric pressure. The valve at the inlet is then shut and the first container is pressurized. The valve between the containers is next opened and the material is transferred to the second pressurized container; the valve between the containers is then shut; the valve downstream of the second container is opened and the second container is emptied, whereupon the downstream valve can be closed again. The first container can be relieved of pressure and the valve upstream of it opened to again allow material to transfer from the storage container to the first container. A lock hopper system gives a discontinuous flow, unless it is supplemented with a rotary feeder downstream of the second lock hopper container.

A report from the Argonne National Laboratory, of 9700 South Cass Avenue, Argonne, Ill. 6043, October 1982, entitled "Discharge and Handling of Solids from Pressurized Fluidized-Bed Combustors", written by John E. Hanway Jr. and W. F. Padolski, describes various lock hopper systems and fuel feeding systems.

The European Pat. No. 0 040 708 describes a transportation system with material feeders of sluice type.

SUMMARY OF THE INVENTION

One object of the present invention is to provide an improved transportation system for the transfer of particulate material from a storage container to a receiving unit, preferably one which is under a higher pressure than that existing in the storage container. The transportation system comprises a material feeder with a closed vertically oriented housing having an upper and a lower end wall, and a rotor arranged in the housing and also provided with an upper and a lower end wall. This material feeder can also replace a rotary feeder and therefore at the same time provide a pressure sluice and a dosing feeder. The rotor has at least one material chamber. Between the end walls of the housing and the rotor there are cooperating sealing surfaces. In the upper end walls of the housing and the rotor there is an inlet opening to the material chamber and in the lower end walls thereof there is an outlet opening from the material chamber to a conveying pipe or container. The inlet openings and outlet openings of the housing and the rotor are positioned immediately opposite each other at different angular positions of the rotor relative to the housing. During filling, the openings in the upper end walls are located opposite to each other and the outlet is blocked. During emptying, the openings in the lower end walls are located opposite to each other and the inlet is blocked. Between the material chamber in the rotor and the outlet opening in the lower end wall of the rotor there is a valve which serves as a material barrier between the material chamber and the outlet opening in the end wall. Suitably, the valve is a so-called L-valve in which material flow is brought about by injection of gas. In addition to the blocking function, the valve may have a flow-regulating function. The blocking function serves to prevent material from entering between the sliding surfaces in the lower end walls of the housing and the rotor.

The rotor is suitably formed with two material chambers, which are gas-tightly separated from each other, but more than two material chambers may also be provided. A gas conduit for pressure gas for activation of a material flow through valve means communicates with a pressure gas source maintained at a higher pressure level than that existing in the corresponding unit when the outlet openings of the material chamber and the housing are located opposite to each other. Alternatively, the rotor accommodates a space which is gas-tightly separated from the material chamber or gas-tightly separated from each material chamber and the surrounding housing, and one channel is provided in the end wall of the rotor and another channel is provided in the end wall of the housing. The channels are so arranged that their orifices are located immediately opposite to each other in the emptying position of the material chamber. In this position, the defined space communicates with a pressure medium source at a pressure which is higher than that existing in the receiving unit. The supply line for pressure gas for activation of the valve means communicates with this space and is thus supplied with pressure gas from this space. The housing communicates permanently, via a conduit, with the pressure gas source for transport gas. Thus, the rotor is surrounded by pressure gas.

A transportation system according to this invention can advantageously be used in a power plant for feeding fuel into a pressurized fluidized bed in a combustion chamber, which is enclosed in a pressure vessel and is surrounded by compressed combustion air, a so-called PfBC plant. The pressure gas for transport and activation of the valve means should then have a higher pressure than the pressure existing in the combustion chamber. This gas may be taken from the pressure vessel or from the combustion chamber. In the latter case the gas will have a low oxygen content, which reduces or eliminates the risk of ignition of the fuel in the transport device and the risk of explosions.

Between the end walls of the rotor and the housing there are cooperating sliding surfaces. One of these sliding surfaces may be provided on an axially displaceable plate, which is supported by springs so that a certain bearing pressure and compensation for dimensional changes owing to thermal expansion and wear are obtained. This plate is provided with appropriate openings for passing particulate material and pressure gas through it.

BRIEF DESCRIPTION OF DRAWINGS

The invention will now be described, by way of example, in greater detail with reference to the accompanying figures, wherein FIG. 1 schematically shows a transportation system in accordance with the invention utilized for feeding fuel or bed material into a pressurized fluidized bed, FIG. 5 shows a section taken on the line V—V in FIG. 3, and FIGS. 6 and 7 show two similar schematic perspective views of the material feeder showing the rotor thereof in its two operating positions.

DESCRIPTION OF PREFERRED EMBODIMENT

Figure 1:
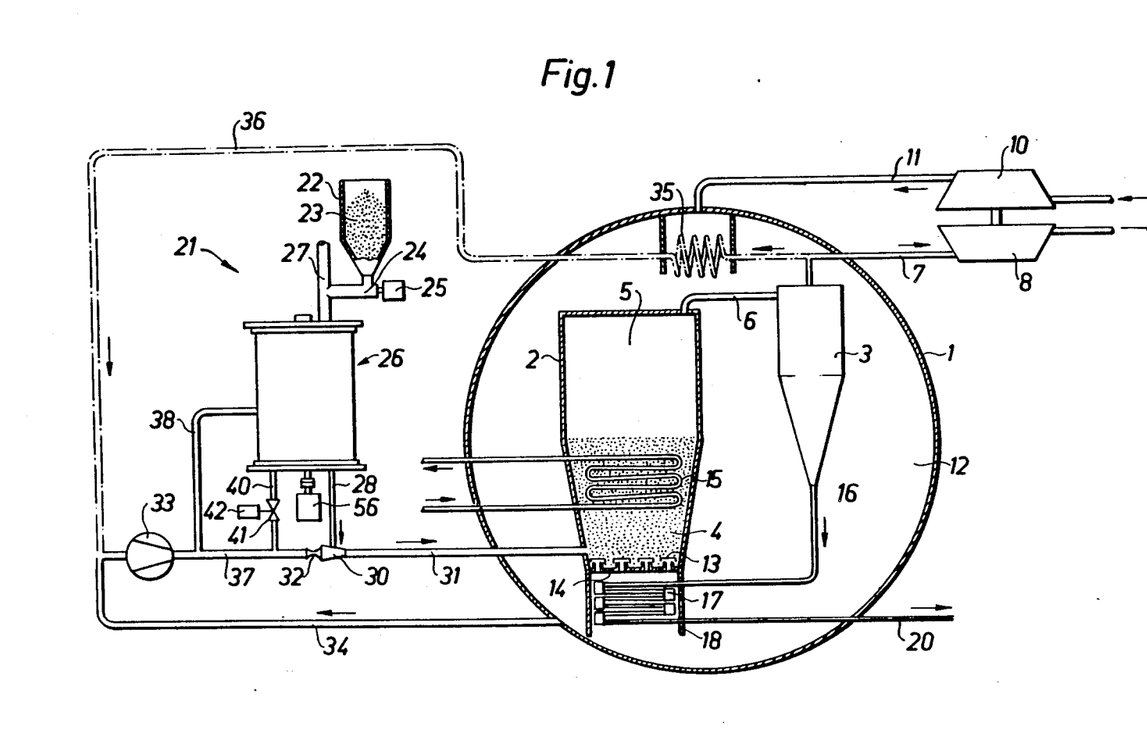

In FIG. 1, 1 designates a pressure vessel, 2 a combustion chamber and 3 a gas cleaner of cyclone type. The combustion chamber 2 and the cleaner 3 are contained within the pressure vessel 1.

Only one cleaning unit 3 is shown, but in reality a cleaning plant would almost certainly be used with a plurality of parallel groups of series-connected units (e.g. cyclones) 3.

Fuel is burned in a fluidized bed 4 in the combustion chamber 2. The combustion gases are collected in a plenum 5 and flow through a conduit 6 to the cleaning unit 3. From the cleaning unit, i.e. cyclone 3, combustion gases, freed from dust, are passed, via a conduit 7, to a turbine 8. The turbine 8 drives a compressor 10. The compressed combustion air is passed, via a conduit 11, to the space 12 in the pressure vessel 1. The combustion air flows from the space 12, via nozzles 13 in a bottom plate 14 of the combustion chamber 2, into the combustion chamber 2 and fluidizes the material in the bed 4. The bed 4 surrounds a bundle 15 of tubes in which steam is generated to drive a steam turbine (not shown). This tube bundle 15 also cools the bed 4.

Dust separated in the cleaning unit 3 is led through a conduit 16 to a dust discharge device 17, which is cooled by the combustion air as it flows upwardly to the nozzles 13 constrained by a skirt 18. Through a conduit 20, the dust is transported to a collecting vessel (not shown) outside the pressure vessel 1.

Fuel is supplied to the combustion chamber 2 by means of a pneumatic transportation system 21. This comprises a fuel container 22 (containing a particulate fuel 23, for example crushed coal, which may possibly be mixed with a sulfur absorbent) and a discharge device 24 (e.g. a worm conveyor) which is driven by a motor 25 and supplies fuel to a material feeder 26 via a conduit 27. From the material feeder 26, fuel is led via a vertical tube 28 to a mixing location 30 for fuel and transport gas and from this, in a conveying pipe 31, to fuel nozzles (not shown) in the combustion chamber 2. A nozzle 32 upstream of the mixing location 30 is suitably a Laval nozzle. When using a Laval nozzle, an essentially constant speed of the transport gas in the pipe 31 is obtained, independently of the pressure existing downstream of the nozzle 32 when this pressure is lower than the pressure upstream of the nozzle 32 by at least about 5 per cent. In other types of throttle means, a greater pressure difference is required to ensure constant speed of the transport gas in the pipe 31 under varying pressure conditions downstream of the nozzle 32. Also, greater energy input to the compressor is required.

For compressing the transport gas, a booster compressor 33 is provided. This is connected, on its suction side, either to the space 12 in the pressure vessel 1 (through a conduit 34), or to the conduit 7 leading from he cyclone 3 via a cooler 35 and a conduit 36. The cooler 35 is cooled by heat exchange with the compressed air from the compressor 10, whereby the heat is used to preheat the combustion air. Thus, in the latter embodiment, a transport gas of low oxygen content is obtained, which reduces or, at best, eliminates the risk of explosions or fire in the fuel transportation system 21. The compressor 33 is connected to the mixing location 30 by means of a conduit 37. The material feeder 26 is connected to the conduit 37 by means of a first conduit 38 and a second conduit 40 having a regulating valve 41 therein with an operating device 42.

Figure 2:
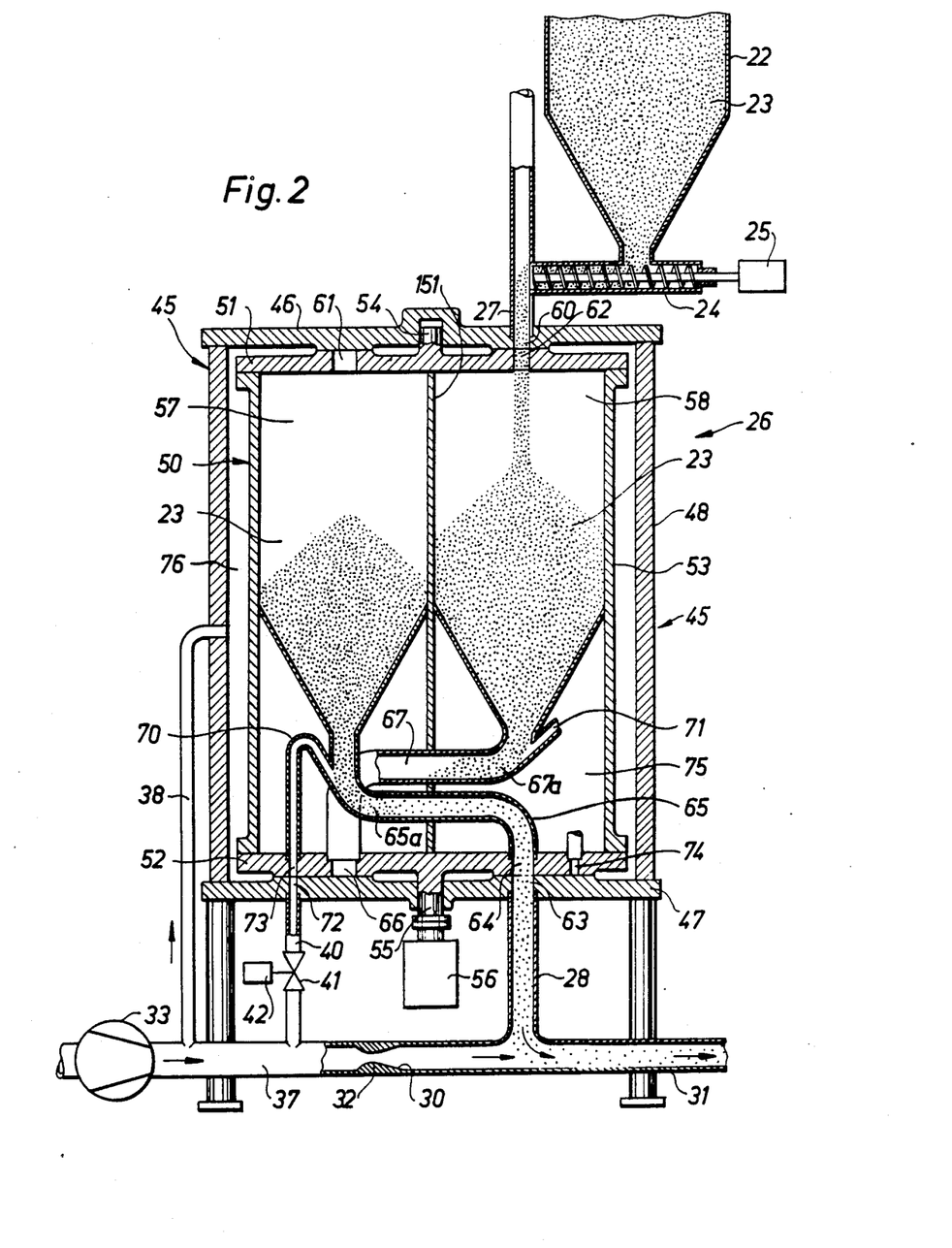
FIG. 2 shows a schematic section through the material feeder included in the transportation system.

In the schematic embodiment according to FIG. 2, the material feeder 26 comprises a housing 45 having a circular upper end wall 46, a lower end wall 47 and a cylindrical wall 48. A rotor 50 is rotatably arranged in the housing 45. The rotor 50 comprises an upper end wall 51, a lower end wall 52 and a circular side wall 53. The end walls 51, 52 of the rotor 50 are provided with shaft ends 54 and 55 which are journalled in the end walls 46, 47 of the housing 45. The rotor 50 is driven by a motor 56.

The rotor 50 is formed with two material chambers 57 and 58. The upper end wall 46 of the housing 45 is provided with an axial inlet opening 60, which is connected to the conduit 27. The upper end wall 51 of the rotor 50 is provided with a first inlet opening 61 to the material chamber 57 and a second inlet opening 62 to the material chamber 58. The lower end wall 47 of the housing 45 is provided with an axial outlet opening 63, which is connected to the tube 28. The lower end wall 52 of the rotor 50 is provided with a first outlet opening 64, which is connected to the material chamber 57 by means of a conduit 65, and a second outlet opening 66, which is connected to the material chamber 58 by means of a conduit 67. These conduits 65 and 67 form so-called L-valves 65a and 67a. To produce material flow through the L-valves 65a and 67a, these valves are supplied with pressure gas through the conduits 70 and 71, respectively. The lower end wall 47 of the housing 45 is provided with an inlet opening 72 for pressure gas which is connected to the conduit 40. The lower end wall 52 of the rotor 50 is provided with two openings 73 and 74. FIG. 2 shows two different embodiments for connection of the L-valves to a pressure gas source. In the embodiment shown in the left-hand part of Figure 2, the tube 70 is connected to the opening 73. In the embodiment shown in the right-hand part of FIG. 2, the tube 71 opens into a space 75 which is gas-tightly separated from the material chamber 58 and the housing 45, and the L-valve 67a is supplied with pressure gas via this space 75. The volume 76 in the housing 45 surrounding the rotor 50 communicates through the conduit 38 with the pressure gas conduit 37 and is thus under pressure.

The material feeder 26 operates as follows: In the illustrated position of the rotor 50 the inlet openings 60 and 62 and the outlet openings 63 and 64 are, respectively aligned with each other, whereas, on the other hand, the inlet opening 61 and the outlet opening 66 are closed by the end walls 46 and 47, respectively, of the housing 45. If the L-valve 65a is now supplied with activation gas from the conduit 40, the regulating valve 41, the openings 72, 73 and the conduit 70, the material chamber 57 will start to empty. The emptying rate can be regulated by regulating the gas flow to the L-valve 65a. The regulation can be performed by continuous regulation of the flow through the valve 41 or by pulsing of the gas flow by means of this valve 41.

The inlet openings 60 and 62 are in alignment with each other, while the openings 66 and 74 are sealed by the lower end wall 47 of the housing 45. Material 23 from the container 22 is fed, via the screw feeder 24, to the vertical tube 27 and falls through the openings 60 and 62 down into the chamber 58 to commence a filling of this chamber. In this position, the L-valve 67a is closed. When the chamber 57 has been emptied and the chamber 58 has been filled to the desired level, the rotor 50 is rotated so that the openings 60 and 61, the openings 63 and 66 and the openings 72 and 74 are respectively positioned immediately opposite to each other. The chamber 58 can now be emptied and the chamber 57 filled. In this position, the gas for activation of the material flow is supplied through the L-valve 67a via the space 75. When either of the chambers 57 and 58 has been emptied and the rotor 50 rotated so that the inlet opening (61 or 62) of the emptied chamber is aligned to the opening 60 in the end wall 46, pressure gas flows out into the atmosphere via the tube 27, and the chamber will thus be relieved of pressure prior to its next filling from the container 22.

To prevent the chambers 57 and 58 from being over filled and to control the emptying thereof, transducers may be provided in the upper and lower parts of these chambers and in the rotor 50. These transducers may suitably be of radiation type. Another possibility of preventing overfilling is to arrange, above the material feeder 26, a dosing feeder which supplies the material chambers 57 and 58 with a metered amount of material during the filling operation.

In the preferred embodiment shown in FIGS. 3–7, the bottom part 47 of the housing 45 is formed with a part 47a which is fixedly joined to the wall 48 and an axially limited movable part 47b which is supported on a number of spring units 80 which are axially adjustable by means of bolts 81. The spring units 80 may be built up of cup springs. The part 47b is connected to the part 47a or to the wall 48 by means of devices (not shown) so as to prevent its rotation relative to the part 47a. Between an opening 72a in the part 47a and an opening 72b in the part 47b there is an elastic pipe connection 82 which bridges the gap 83 formed between the parts 47a, 47b. Between an opening 63a in the part 47a and an opening 63b in the part 47b there is an elastic connection 84 in the form of a bellows which also bridges the gap 83. The shaft 55 is journalled in a bearing 85 in the part 47a, this bearing 85 being provided with a first flange 86 which constitutes a centering guide for the part 47b and with a second flange 87 by which it is fixedly joined to the lower end wall 52 of the rotor 50. The shaft 55 is surrounded by a stuffing box 88. The motor 56 consists of a double-acting operating cylinder - hydraluic or pneumatic - which is connected to the shaft 55 by means of an arm 90 which turns the rotor 50 between its two angular limit positions in relation to the housing 45.

The upper end wall 46 of the housing 45 is also made in two parts. Its outer part 46a is fixed to the wall 48 and its inner part 46b is arranged with limited axial movability but is connected to the part 46a or the wall 48 so as to be prevented from turning with the rotor. Between the parts 46a and 46b there are a number of spring units 91 (only one of which is shown) which are adjustable by means of bolts 92 in the end wall part 46a. The shaft 54 is journalled in the part 46a in a bearing 93. The shaft 54 is provided with a first flange 94 which forms a radial guide for the part 46b and a second flange 95 by means of which it is connected to the upper end wall 51 of the rotor 50. Between openings 60a and 60b in the respective parts 46a and 46b there is a bellows 97 which bridges a gap 96 formed between the parts 46a, 46b. The spring units 80 and 91 press the axially movable end wall parts 47b and 46b of the housing 45 against the respective end walls 52 and 51 of the rotor 50 with an appropriately adjusted force. The rotor 50 can be supported by the shaft 55 and a thrust bearing 98 or by the end wall part 47b of the housing 45.

Figure 3:
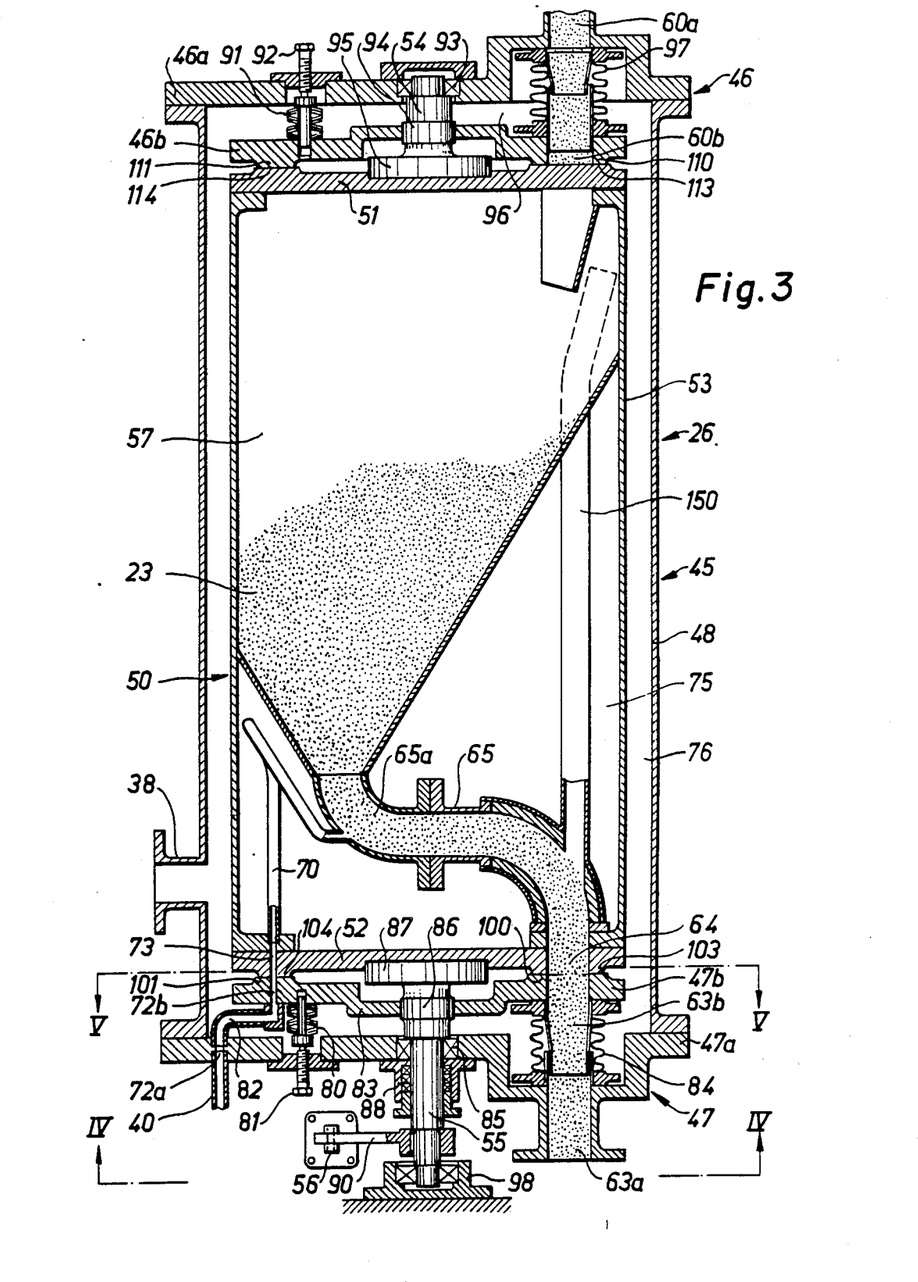
FIG. 3 shows a preferred embodiment of chamber in the system taken on a section line III—III in FIG. 5.
Figure 4:
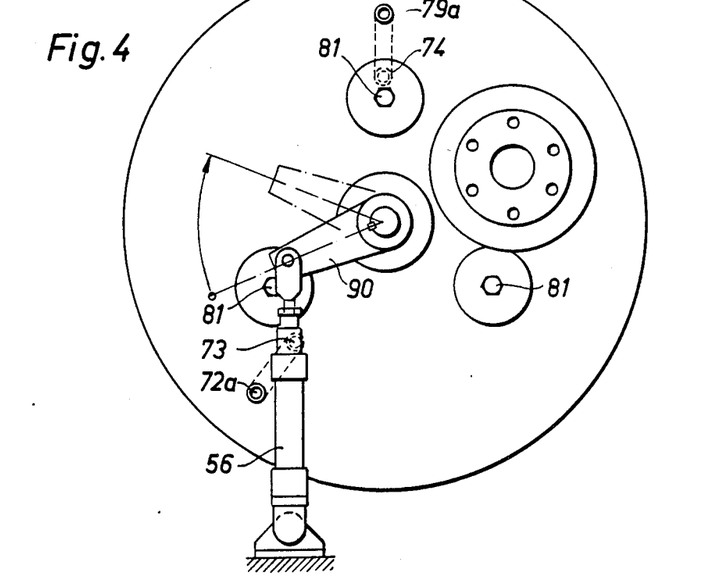
FIG. 4 shows a bottom view taken on the line IV—IV in FIG. 3.
Figure 5:
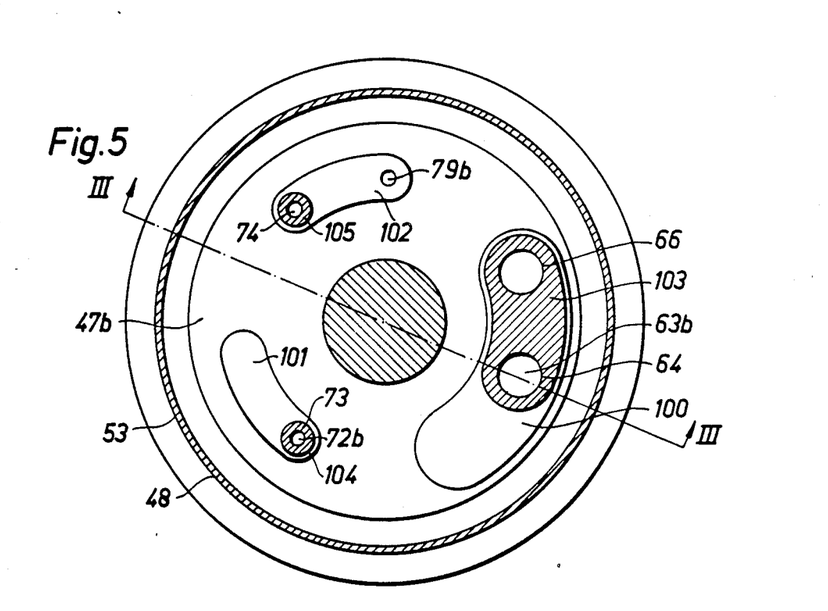
Figure 6:
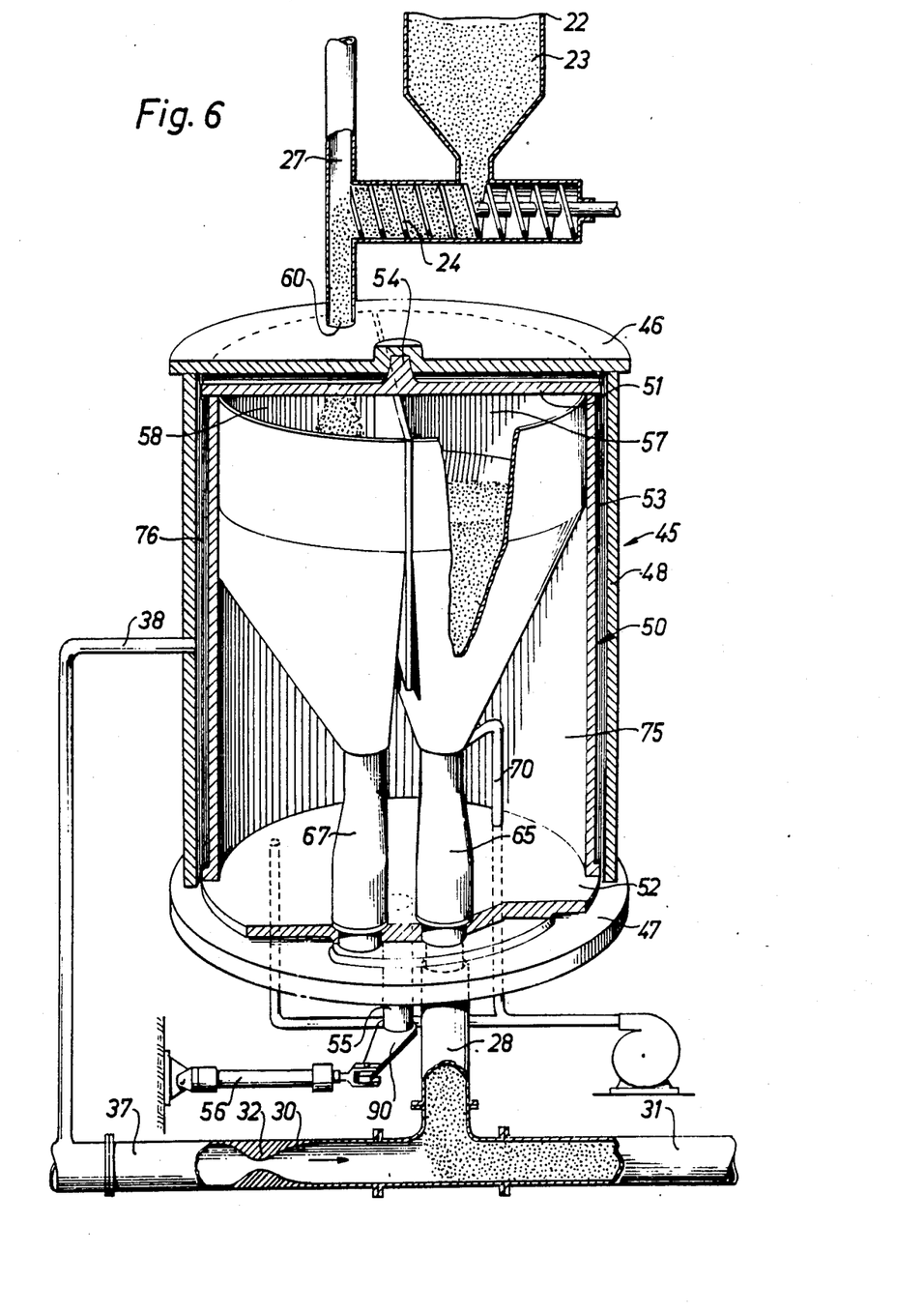
Figure 7:
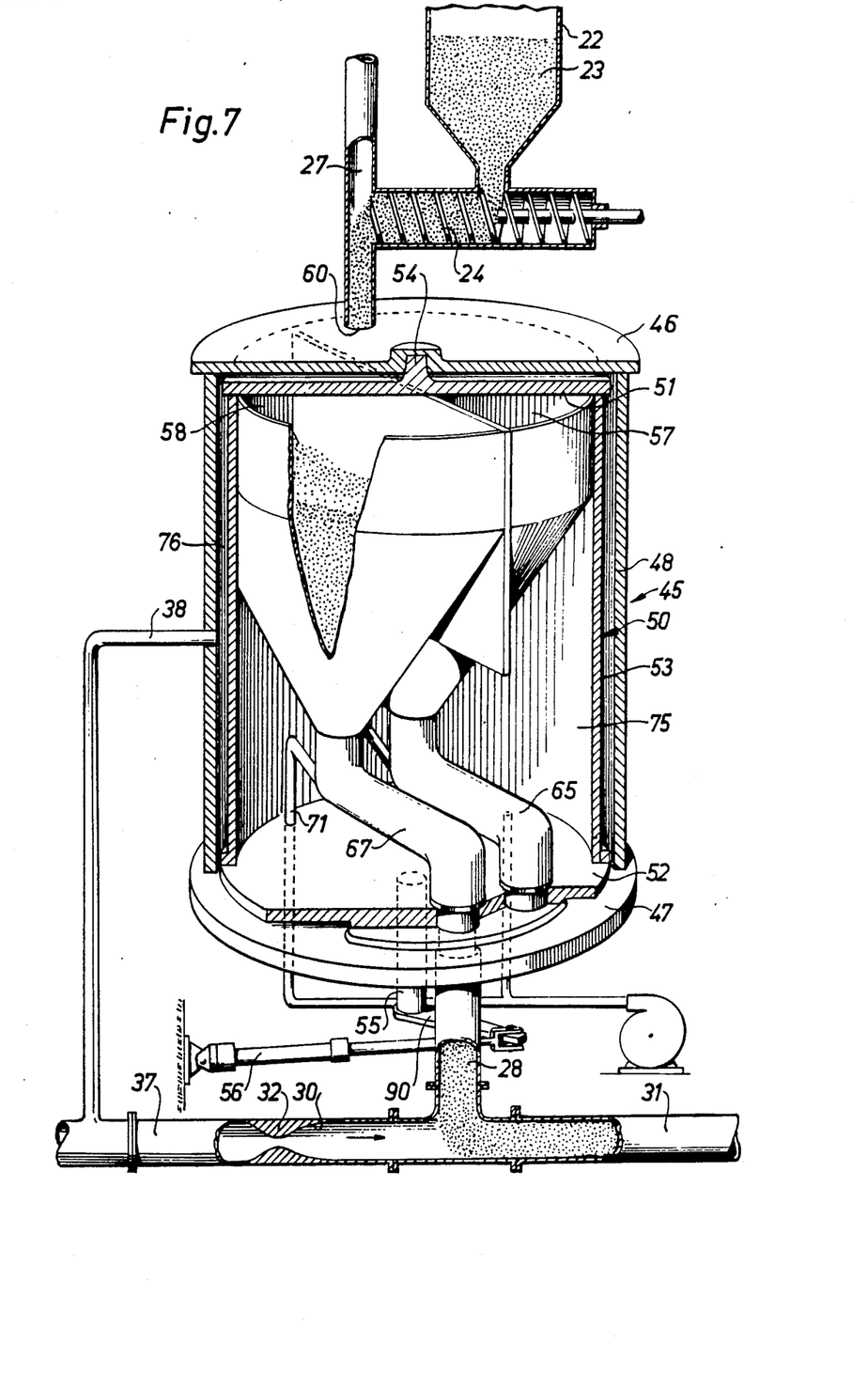

The upper part 47b of the lower end wall 47 of the housing 45 and the lower end wall 52 of the rotor 50 are formed with three projections 100, 101, 102, 103, 104, 105, protruding from the respective surfaces, (see FIGS. 3 and 5). The surfaces of these projections 100–105 slide against each other and form cooperating sealing surfaces. FIGS. 2, 3 and 5 show the position of the housing and rotor during emptying of the material chamber 57. The openings 63a and 64 and the openings 72b and 73 are then respectively aligned with each other. A free oulet for the material 23 and a free inflow of gas for the activation of the L-valve 65a is thus provided. When supplying propellent gas through the conduit 70, the material chamber 57 will be emptied. The emptying rate is regulated by means of the rate of gas supply. This regulation can be achieved advantageously by pulsing of the gas flow by means of the valve 41. Through a pipe connection 150 (see FIG. 3), equalization of the pressure is obtained between the tube 65 and the material chamber 57 when the rotor 50 is rotated to the position shown in FIG. 3 and during the emptying stage. The opening 74 in the projection 105 is blocked by the projection 102, so that no communication exists between the conduit 40 and the material chamber 58 which is simultaneously filled. By forming the end wall 52 and the end wall part 47b with projections 100–105 with limited sliding surfaces, good sealing conditions are obtained. By providing a valve 65a in the conduit 65, the material 23 can be prevented from naturally flowing down into the lower part of the conduit 65 where it could cause wear of the sealing surfaces during rotation of the rotor 50. By maintaining the volume 76 permanently pressurized, the risk of material entering between cooperating sealing surfaces of the projections 100–105, and there causing wear damage, is reduced. Through the spring units 80 such a resilient mounting of the part 47b is obtained that this part is permanently held in contact with the end wall part 52 in the rotor 50, even if a certain amount of wear has taken place in the sealing surfaces.

The upper end wall 51 of the rotor 50 and the inner end wall part 46b of the housing 45 are formed in a similar manner with projections 110, 111, 113 and 114 with cooperating sliding surfaces and openings. In addition to these four projections 110–114 there may be two more projections (not shown in the Figures), one of which is placed on the end wall part 46b and the other on the end wall part 51, thus obtaining three points of contact and therefore good static stability.

For pressure compensation between the chamber 57 and the outlet tube 65 during emptying, as shown in FIG. 3, a pipe connection 150 is provided between the lower part of the tube 65 and the chamber 57. This pipe 150 is necessary for good functioning of the L-valve.

The invention is not to be considered as being limited to the embodiments shown in the drawings since many modifications thereof are clearly possible within the scope of the following claims.

I claim:

1. A pneumatic transportation system for transferring a particulate material from a storage container to a receiving unit, the system comprising:
   a material feeder with a closed vertically oriented housing having an upper and a lower end wall;
   a rotor turnably located in the housing;
   drive means for rotating the rotor through different angular positions in the housing, the rotor having an upper and a lower end wall and at least one material chamber defined therebetween;
   sealing surfaces cooperating between the end walls of the housing and the rotor;
   means defining an inlet to the material chamber in the upper end walls of the housing and the rotor, respectively;
   means defining an outlet in the lower end walls of the rotor and the housing, respectively, the outlets being arranged so that the inlets and outlets of the housing and the rotor are positioned immediately opposite to each other at different angular positions of the rotor in relation to the housing;
   a bent outlet conduit integrated at a terminal end of the material chamber, the outlet conduit being connected to an opening of the rotor to form a material lock and an L-type valve means for the particulate material between the material chamber and the outlet of the rotor, and gas conduit means connecting the outlet conduit forming the L-valve means to a gas supply means for discharging the particulate material from the material chamber when the drive means rotates the rotor to an appropriate angular position for aligning the outlet of the rotor to the outlet of the housing.

2. A transportation system according to claim 1, wherein the bent outlet conduit is a gas supply conduit for providing activation gas for the L-valve; and
   wherein the system further comprises a regulating valve for regulating the gas flow through the gas supply conduit for regulating the material flowing through the L-valve.

3. A transportation system according to claim 1, wherein the rotor is formed with at least two material chambers which are separated from each other in a gas-tight manner.

4. A transportation system according to claim 1, wherein the bent outlet conduit is a gas conduit connected to the L-valve for supplying thereto pressure gas to activate material flow through the L-valve; and wherein the system further comprises
   a pressure gas source in communication with the gas conduit, the gas source being maintained under a higher pressure than exists in the receiving unit when the outlets of the material chamber and the housing are positioned immediately opposite to each other.

5. A transportation system according to claim 1, further comprising:
   a space provided in the rotor, the space being gas-tightly separated from the material chamber and the surrounding housing, the space being placed in communication, through channels in the end walls of the rotor and the housing, respectively, with a pressure medium source maintained at a higher pressure than exists in the receiving unit when the rotor is in the angular position used for emptying the material chamber.

6. A transportation system according to claim 5, wherein the bent outlet conduit is a pressure gas supply conduit communicating with the space, the supply conduit activating the material flow through the valve means.

7. A transportation system according to claim 1, further comprising a pressure compensating means connecting the upper part of the material chamber to the valve means and the outlet of the rotor.

8. A transportation system according to claim 1, wherein the housing communicates permanently, via a conduit means, with a pressure medium source maintained at a higher pressure than that existing in the material chamber.

9. A transportation system according to claim 1, wherein the receiving unit is a fluidized bed combustion chamber in a pressure vessel, the transportation system connecting a storage container having a particulate material to be fed to the fluidized bed; and the transportation system further comprising:
   a pressure medium source, the source being a compressor which generates a pressure gas wih a higher pressure than existing in the combustion chamber for activating the bed material flow through the L-valve, for pressurizing the housing surrounding the rotor, and for transporting the particulate bed material.

10. A transportation system according to claim 9, wherein the compressor is a booster compressor which increases the pressure of combustion air in the pressure vessel.

11. A transportation system according to claim 9, wherein the compressor is a booster compressor which increases the pressure of inert combustion gases generated in the combustion chamber.

12. A transportation system according to claim 9, wherein the bed material is at least one of a fuel mixed with a sulfur absorbent.

13. A transportation system according to claim 1, wherein the housing accommodates at least one plate, spring means resiliently supporting the at least one plate with a sliding surface cooperating with one end wall of the rotor and with an opening for material flow through the plate provided therein.

14. A transportation system according to claim 13, wherein the at least one plate has a further opening therein for supplying compressed gas to activate the valve means at the outlet of the rotor, the opening being located opposite to an opening in the end wall of the rotor in the angular position of the rotor used for emptying the material chamber.

* * * * *